UNITED STATES PATENT OFFICE.

BAPTIST REUTER, OF HÖCHST-ON-THE-MAIN, GERMANY, ASSIGNOR, BY MESNE ASSIGNMENTS, TO THE FIRM OF H. A. METZ & CO., OF NEW YORK, N. Y.

PROCESS OF MAKING COMPOUNDS OF THE ACTIVE SUBSTANCE OF SUPRARENAL GLANDS, AND SAID COMPOUNDS.

970,112.      Specification of Letters Patent.      Patented Sept. 13, 1910.

No Drawing.      Application filed December 1, 1903. Serial No. 183,371.

*To all whom it may concern:*

Be it known that I, BAPTIST REUTER, a citizen of the Empire of Germany, and residing at Höchst-on-the-Main, Germany, have invented a certain new and useful Process of Making Compounds of the Active Substance of Suprarenal Glands, and Said Compounds, of which the following is a specification.

The base of the active substance of suprarenal glands decomposing at 207° C. is soluble with difficulty in water and neutral aqueous liquids, but readily soluble in dilute acids. It has hitherto been used as free base (powder) or as salt solutions. These two forms, when practically employed, have various drawbacks. The stability of the salt solutions is limited, being of a certain concentration, unavoidable with every solution admitting of dilution but not of concentration. In using the base the difficulties increase, as it has first to be transformed into a suitable solution which requires exact working on the part of the physician, the presence of acids of certain degrees etc.

A want made itself felt for stable compounds of the active base readily soluble in water. It may be obtained by evaporating the hydrochlorid or sulfate solutions of the base of suprarenal glands to solid compounds which, however, are too hydroscopic and decompose too readily in the air.

I have found that a solid compound of the suprarenal glands stable in air may be obtained by dissolving the base in water while adding 1½ molecular proportions of boric acid and by evaporating the solution thus obtained to dryness or only to a syrupy consistence and adding absolute alcohol, whereupon the boric acid compound of the suprarenal glands is precipitated in solid form. It is then dried and pulverized. The salt thus obtained has the active properties of the base of suprarenal glands. The boric acid compounds have the following properties. From a physiological point of view they are equal to those of the base in hydrochloric acid, without however, as the latter, irritating the tissues. They separate no base on addition of alkalies; on addition of ferric chlorid they turn violet and on a further addition of ferric chlorid they assume the characteristic green tint. The solid boric acid compound of the base of suprarenal glands may be heated above the melting point of the free base without decomposing or losing its efficacy by which it is distinguished from a mixture of dry boric acid and the base of suprarenal glands. This property permits of the sterilization of the solid boric acid base of the suprarenal glands at a temperature of about 110° C., which is impossible with the free base on account of its decomposing.

Example: 1.83 gr. of the base of suprarenal glands and 0.93 gr. of boric acid are stirred into 5 gr. of water. After about ½ hour the whole is dissolved and may then be dropped into a vessel heated to about 50° C. and provided with a cooler and vacuum as considerable frothing occurs, until the water is evaporated.

Having now described my invention, what I claim is:—

1. As a new product, a solid compound produced by the union of one and one half (1½) molecules of boric acid and one (1) molecule of the base of the suprarenal glands, stable in air, readily soluble in water and difficultly soluble in alcohol, and having the physiological properties of the base of the suprarenal gland.

2. The herein-described process of producing a dry, stable substance containing the principle of the suprarenal glands, consisting in dissolving the base of said glands and boric acid in molecular proportions of one (1) to one and one-half (1½) in water and then separating the boric acid compound of the base of the glands from the water.

3. The herein-described process of producing a dry, stable substance containing the principle of the suprarenal glands, consisting in dissolving the base of said glands and boric acid in molecular proportions of one (1) and one and one-half (1½) in water and then separating the boric acid compound of the base of the glands from the water by adding alcohol to said water so as to precipitate this borate of the base in the form of a dry crystalline substance which is stable in air, readily soluble in water, and possesses 5 the physiological properties of the base of the suprarenal glands.

In testimony, that I claim the foregoing as my invention, I have signed my name in presence of two subscribing witnesses.

BAPTIST REUTER.

Witnesses:
ALFRED BRISBOIS,
BERNHARD LYDECKER.